(12) United States Patent
Sun et al.

(10) Patent No.: US 10,700,388 B2
(45) Date of Patent: Jun. 30, 2020

(54) BATTERY MANAGEMENT SYSTEM AND BATTERY SYSTEM USING THE SAME

(71) Applicant: INDUSTRIAL TECHNOLOGY RESEARCH INSTITUTE, Hsinchu (TW)

(72) Inventors: Chein-Chung Sun, Kaohsiung (TW); Chi-Hua Chen, Zhubei (TW); Chun-Hung Chou, Tainan (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 820 days.

(21) Appl. No.: 15/392,248

(22) Filed: Dec. 28, 2016

(65) Prior Publication Data

US 2017/0256825 A1    Sep. 7, 2017

(30) Foreign Application Priority Data

Mar. 1, 2016   (TW) .............................. 105106176 A

(51) Int. Cl.
*H02J 7/00* (2006.01)
*H02J 7/14* (2006.01)
(Continued)

(52) U.S. Cl.
CPC ..... *H01M 10/425* (2013.01); *H01M 10/4257* (2013.01); *H01M 10/441* (2013.01);
(Continued)

(58) Field of Classification Search
USPC ........................................................ 320/149
See application file for complete search history.

(56) References Cited

U.S. PATENT DOCUMENTS 6,014,013 A    1/2000  Suppanz et al.
6,104,967 A    8/2000  Hagen et al.
(Continued)

FOREIGN PATENT DOCUMENTS

CN    101432945 A    5/2009
CN    201360156 Y   12/2009
(Continued)

OTHER PUBLICATIONS

Jerman et al., "Miniature Fabry-Perot Interferometers Micromachined in Silicon for Use in Optical Fiber WDM Systems," 1991, IEEE, pp. 372-375.
(Continued)

*Primary Examiner* — Alexis B Pacheco
(74) *Attorney, Agent, or Firm* — Muncy, Geissler, Olds & Lowe, P.C.

(57) ABSTRACT

A battery system includes a unit battery module, a current and coulomb measurement circuit and a master control circuit. The unit battery module stores electricity and calculates battery information of the battery set according to a system current value, a system coulomb value, a cell voltage and a cell temperature of the battery set. The current and coulomb measurement circuit is coupled to the unit battery module, generates the system current value according to the current flowing though the battery set, generates the system coulomb value by integrating the system current value, and provides the system current value and the system coulomb value to the unit battery module. The master control circuit is coupled to the unit battery module, receives the battery information from the unit battery module, generates a system battery information according to the battery information and provides the system battery information to an external device.

14 Claims, 6 Drawing Sheets

(51) Int. Cl.
*H01M 10/42* (2006.01)
*H01M 10/48* (2006.01)
*H01M 10/44* (2006.01)

(52) U.S. Cl.
CPC ......... *H01M 10/48* (2013.01); *H01M 10/482* (2013.01); *H01M 10/486* (2013.01); *H02J 7/0014* (2013.01); *H02J 7/0016* (2013.01); *H02J 7/0021* (2013.01); *H02J 7/0026* (2013.01); *H01M 2010/4271* (2013.01); *H01M 2010/4278* (2013.01); *H01M 2220/20* (2013.01); *Y02T 10/7055* (2013.01)

(56) References Cited

U.S. PATENT DOCUMENTS

| | | | |
|---|---|---|---|
| 9,093,864 | B2 | 7/2015 | Abe et al. |
| 10,124,694 | B2 * | 11/2018 | Yang .................... H02J 7/0014 |
| 2007/0190369 | A1 * | 8/2007 | Leach ................... H02J 7/0018 429/9 |
| 2011/0163723 | A1 | 7/2011 | Tan et al. |
| 2012/0293130 | A1 * | 11/2012 | Burstein .............. H02J 7/0019 320/134 |
| 2013/0009485 | A1 * | 1/2013 | Sakuma ................... H02J 3/32 307/81 |
| 2014/0084867 | A1 * | 3/2014 | Hamaoka ............. H02J 7/0016 320/116 |
| 2014/0111163 | A1 * | 4/2014 | Yamauchi ........... H01M 10/441 320/134 |
| 2014/0306662 | A1 * | 10/2014 | Kim ....................... H02J 7/0016 320/118 |
| 2015/0028816 | A1 | 1/2015 | Lee |
| 2015/0069973 | A1 * | 3/2015 | Yoshida .................. B60L 58/21 320/118 |
| 2015/0293183 | A1 * | 10/2015 | Tenmyo ................ H01M 10/48 324/429 |
| 2016/0105042 | A1 * | 4/2016 | Taylor ....................... H02J 7/00 320/134 |
| 2016/0204627 | A1 * | 7/2016 | Wang .................... H02J 7/0016 320/118 |
| 2016/0226268 | A1 * | 8/2016 | Okui ..................... H02J 7/0018 |
| 2016/0372942 | A1 * | 12/2016 | Marinov ............... H02J 7/0021 |

FOREIGN PATENT DOCUMENTS

| | | |
|---|---|---|
| CN | 102487209 A | 6/2012 |
| CN | 202276167 U | 6/2012 |
| CN | 103410283 A | 11/2013 |
| CN | 103779943 A | 5/2014 |
| CN | 103840521 A | 6/2014 |
| CN | 104052091 A | 9/2014 |
| CN | 104065141 A | 9/2014 |
| CN | 104377765 A | 2/2015 |
| CN | 204258346 U | 4/2015 |
| TW | 201013382 A | 4/2010 |
| TW | 201203779 A | 1/2012 |
| TW | 201325023 A | 6/2013 |
| TW | 201509068 A | 3/2015 |

OTHER PUBLICATIONS

Bakir, Muhannad, "Sea of Polymer Pillars Electrical and Optical Chip I/O Interconnections for Gigascale Integration," IEEE Transactions on Electron Devices, vol. 51, No. 7, Jul. 2004, pp. 1069-1077.

Ma et al., "Channel Drop Filters Using Photonic Crystal Fabry-Perot Resonators," Optics Communications, vol. 284 (2011), pp. 1192-1196.

Kobayashi et al., "Improvement of Coupling Efficiency for Passive Alignment of Stacked Multifiber Tapes to a Vertical-Cavity Surface-Emitting Laser Array," Jpn. J. Appl. Phys. vol. 36 (1997) pp. 1872-1875, Part 1, No. 3B, Mar. 1997.

Ogunsola et al., "Chip-Level Waveguide-Mirror-Pillar Optical Interconnect Structure," IEEE Photonics Technology Letters, vol. 18, No. 15, Aug. 1, 2006, pp. 1672-1674.

"Battery and Energy Technologies," Battery Management and Monitoring Systems (BMS); Copyright 2005; Title of website, retrieved from URL http://www.mpoweruk.com/bms.htm on Apr. 6, 2017, pp. 1-8.

Hande et al., "An electromechanical transfer circuit to measure individual battery voltages in series packs," Journal of Power Sources 162 (2006), pp. 719-726.

Chatzakis et al., "Designing a New Generalized Battery Management System,", IEEE Transactions on Industrial Electronics, vol. 50, No. 5, Oct. 2003, pp. 990-999.

Dai et al., "Cell-BMS validation with a hardware-in-the-loop simulation of lithium-ion battery cells for electric vehicles," Electrical Power and Energy Systems 52 (2013) pp. 174-184.

Lopes et al., "Integration of Electric Vehicles in the Electric Power System," Proceedings of the IEEE, vol. 99, No. 1, Jan. 2011, pp. 168-183.

Kim et al., "DESA: Dependable, Efficient, Scalable Architecture for Management of Large-Scale Batteries," IEEE Transactions on Industrial Informatics, vol. 8, No. 2, May 2012, pp. 406-417.

"Battery and Energy Technologies," Battery Management and Monitoring Systems (BMS); Copyright 2005; Title of website, retrieved from URL http://www.mpoweruk.com/bms.htm on Apr. 6, 2017, pp. 1-7.

* cited by examiner

BATTERY MANAGEMENT SYSTEM AND BATTERY SYSTEM USING THE SAME

CROSS-REFERENCE TO RELATED APPLICATION

The present application is based on, and claims priority from, Taiwan Application Serial Number 105106176, filed on Mar. 1, 2016, the disclosure of which is hereby incorporated by reference herein in its entirety.

TECHNICAL FIELD

The technical field relates to a battery management system and a battery system using the same.

BACKGROUND

Battery systems are widely applied to all kinds of electric cars, UPS (Uninterruptible Power Supply), and related energy storage devices. A battery system may manage batteries to avoid the occurrence of abnormal events such as overcharge/discharge or overheat.

It is known that a battery system uses a centralized management of the batteries s and stores data gathered from each battery set. However, as the number of the battery sets in the battery system increases, the amount of computation of the associated processing circuitry increases significantly. Especially when parts of the battery sets are changed, it takes much time and labor costs to update the information of the whole battery sets and leads to hardly maintain the update for the battery system.

Therefore, how to provide a convenient management and maintenance for the battery system is one of important topics for industry study.

SUMMARY

According to an embodiment of the disclosure, a battery system comprises a unit battery module, a current and coulomb measurement circuit and a master control circuit. The unit battery module includes a battery set and a unit battery management circuit. The battery set is used to store an electrical energy. The unit battery management circuit calculates a battery information of the battery set according to a system current value, a system coulomb value, a cell voltage and a cell temperature of the battery set. The current and coulomb measurement circuit is coupled to the unit battery module, generates the system current value according to a current flowing though the battery set, generates the system coulomb value by integrating the system current value, and provides the system current value and the system coulomb value to the unit battery module. The master control circuit is coupled to the unit battery module, receives the battery information from the unit battery module, generates a system battery information according to the battery information and provides the system battery information to an external device.

According to another embodiment of the disclosure, a battery management system is adapted to manage an information of a battery set. The battery management system comprises a unit battery management circuit, a current and coulomb measurement circuit and a master control circuit. The unit battery management circuit calculates a battery information of the battery set according to a system current value, a system coulomb value, a cell voltage and a cell temperature of the battery set. The current and coulomb measurement circuit is coupled to the unit battery management circuit, generates the system current value according to a current flowing through the battery set, generates the system coulomb value by integrating the system current value, and transmits the system current value and the system coulomb value to the unit battery management circuit. The master control circuit is coupled to the unit battery management circuit, receives the battery information from the unit battery management circuit, generates a system battery information according to the battery information and provides the system battery information to an external device.

The foregoing will become better understood from a careful reading of a detailed description provided herein below with appropriate reference to the accompanying drawings.

DETAILED DESCRIPTION OF DISCLOSED EMBODIMENTS

Figure 1:
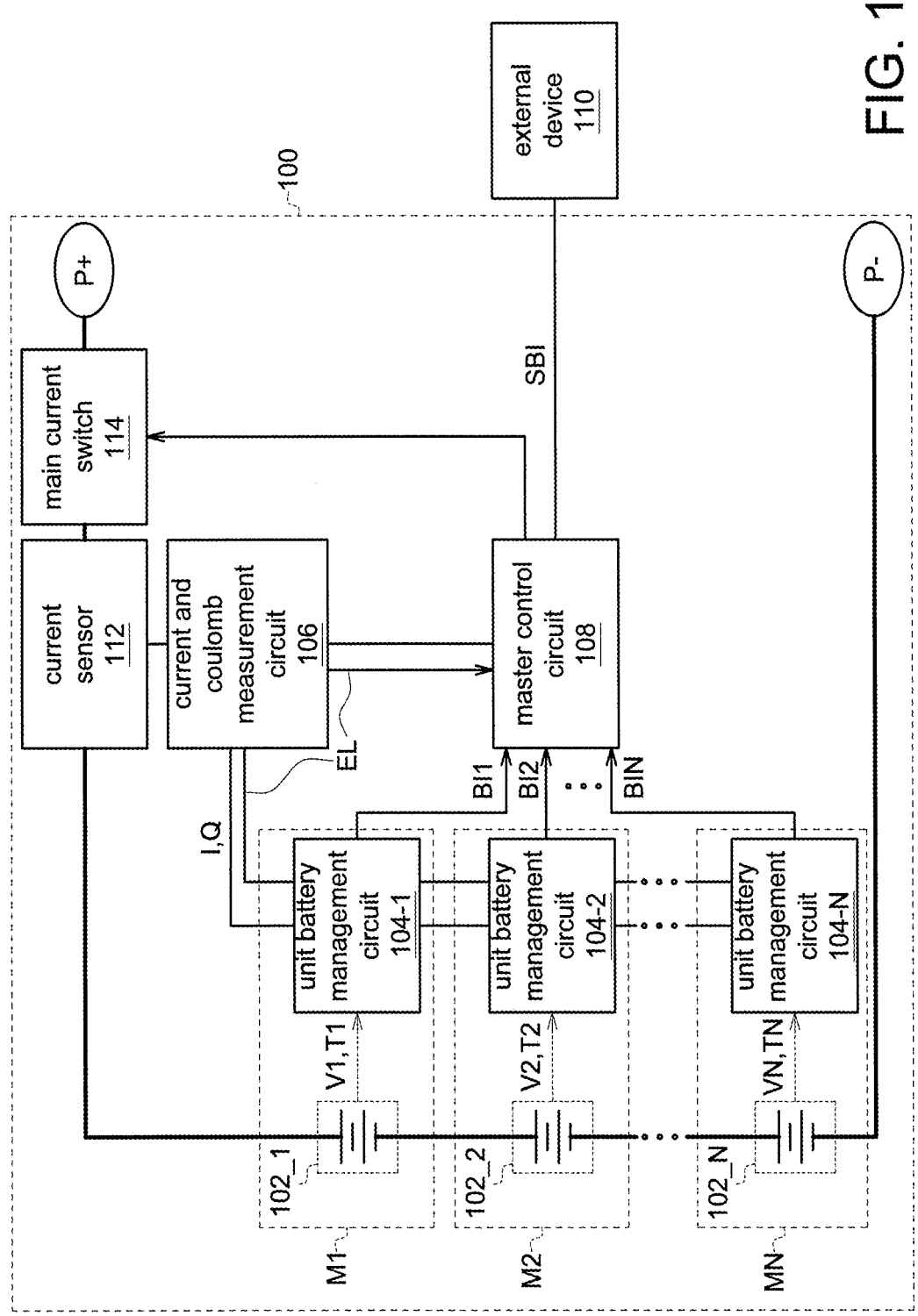
FIG. 1 is a block diagram of a battery system, according to an exemplary embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The disclosure relates to a battery management system and a battery system using the same, which use a modularized architecture to have the measuring and the processing for the battery information of different battery sets being distributed, thereby reducing the computation load of the master control circuit in the system. Thus, the complexity of replacing the battery sets is simplified, and the maintenance of the system is enhanced.

FIG. 1 is a block diagram of a battery system 100, according to an exemplary embodiment. The battery system 100 comprises one or more unit battery modules M1-MN (N is positive integer), a current and coulomb measurement circuit 106, and a master control circuit 108.

Each of the unit battery modules M1-MN includes a battery set and a unit battery management circuit. As shown in FIG. 1, the unit battery module M1 includes a battery set 102_1 and a unit battery management circuit 104_1. The unit battery module M2 includes a battery set 102_2 and a unit battery management circuit 104_2. The unit battery module MN includes a battery set 102_N and a unit battery management circuit 104_N. The unit battery modules M1-MN are connected in series. In other words, the current lines of the battery sets 102_1-102_N are electrically connected in series, and the signal lines of the unit battery management circuits 104_1-104_N are electrically connected in series. In general, a whole circuit assembly of the battery system 100 without the battery sets 102_1-102_N is regarded as a battery management system (BMS) to manage and process the information of each battery set.

The battery sets 102_1-102_N are used to store electric energy. Each unit battery management circuit 104_J calculates battery information corresponding to the battery set 102_J according to a system current value I, a system coulomb value Q, a cell voltage VJ corresponding to the battery set 102_J and a cell temperature TJ corresponding to the battery set 102_J, wherein 1≤J≤N. The system current value I represents a current value passing through the battery sets 102_1-102_N. Base on the relationship $Q=\int I \cdot dt$ between electric current and electric quantity, the system coulomb value Q is obtained by the integral of the system current value I with respect to time t. The system coulomb value Q represents a total quantity of electric charge of the whole battery sets 102_1-102_N. The cell voltage VJ represents a total voltage of the battery set 102_J. In the embodiment, the battery set 102_J have two cells BJ1 and BJ2 in series, and the two cells BJ1 and BJ2 have voltages VJ1 and VJ2 respectively. The cell voltage VJ is a sum of the voltages VJ1 and VJ2 of the two cells BJ1 and BJ2.

In general the needed information for estimating the battery status is based on four parameters as current, quantity of electric charge, voltage, and temperature. After getting the four parameters, each of unit battery modules M1-MN generates the needed information by calculating. For example, the unit battery management circuit 104_1 calculates battery information BI1 of the battery set 102_1 according to the system current value I, the system coulomb value Q, the cell voltage V1 of the battery set 102_1 and the cell temperature T1 of the battery set 102_1. The unit battery management circuit 104_2 calculates battery information BI2 of the battery set 102_2 according to the system current value I, the system coulomb value Q, the cell voltage V2 of the battery set 102_2 and the cell temperature T2 of the battery set 102_2. The unit battery management circuit 104_N calculates battery information BIN of the battery set 102_N according to the system current value I, the system coulomb value Q, the cell voltage VN of the battery set 102_N and the cell temperature T1 of the battery set 102_N. Each of battery information BI1-BIN comprises at least one of residual capacity, deteriorating capacity, internal resistance, and health status of a corresponding-battery set.

The current and coulomb measurement circuit 106 is coupled to each of the unit battery modules M1-MN, generates the system current value I according to the current flowing through each of the battery set 102_1-102_N, generates the system coulomb value Q by integrating the system current value I, and transmits the system current value I and the system coulomb value Q to each of the unit battery modules M1-MN. For example, the current and coulomb measurement circuit 106 broadcasts the system current value I and the system coulomb value Q to each of the unit battery module M1-MN through a communication bus. The communication bus may be a controller area network (CAN) communication bus, a local interconnect network (LIN) communication bus, an inter-integrated circuit (I2C) communication bus, or a RS485 communication bus. In one embodiment, the current and coulomb measurement circuit 106 is built-in the master control circuit 108. In another embodiment, the current and coulomb measurement circuit 106 is realized by a circuit which is independent of the master control circuit 108.

The master control circuit 108 is responsible externally for generating the representative information of the battery system 100 and communicating with an external device 110 for receiving and transmitting related information and control commands. The master control circuit 108 is also responsible internally for communicating with the unit battery modules M1-MN such as receiving related information from the unit battery modules M1-MN and transforming into the representative information of the battery system 100. As shown in FIG. 1, the master control circuit 108 is coupled to each of the unit battery modules M1-MN, receives battery information BI1-BIN from the unit battery modules M1-MN, respectively, and generates system battery information SBI according to the battery information BI1-BIN for providing the system battery information SBI to the external device 110. For example, after receiving the battery information BI1-BIN such as the highest voltage, the lowest voltage, the temperature, the residual electricity, the deteriorating capacity, and the protective status, from each of the unit battery modules M1-MN, the master control circuit 108 calculates and obtains the system battery information SBI of the battery system 100 such as system the temperature, the voltage, and the residual capacity. The external device 110 may be a motor, a dashboard, a charger or other energy consumption devices, and may regulate the energy consumption status in response to the system battery information SBI.

In one embodiment, the battery system 100 further comprises a current sensor 112. The current sensor 112 connects to the unit battery modules M1-MN in series via, for example, a current line, and is coupled to the current and coulomb measurement circuit 106. The current sensor 112 is adapted to measure the current passing through the battery set 102_1-102_N of the unit battery modules M1-MN, and provide the current to the current and coulomb measurement circuit 106 for obtaining the system current value I. The current sensor 112 may be a current shunt, a Hall sensor, or other sensors which may measure the current. In one embodiment, the current sensor 112 may be integrated into the current and coulomb measurement circuit 106.

In one embodiment, the battery system 100 further comprises a main current switch 114 controlled by the master control circuit 108. The main current switch 114 may selectively conduct or block the charge and discharge path of the battery system 100 to protect the internal cells of the battery system 100 from damage due to abnormal condition such as over charge or over discharge. The main current switch 114 may be disposed in any position of the positive or negative pole on an output path of the battery system 100, such as in the positive pole (P+) or the negative pole (P−) of an electric output end. As shown in FIG. 1, the main current switch 114 is disposed at the positive pole (P+), but the scope of the disclosure is not limited thereto.

When the unit battery management circuit (such as 104_1) detects the cell voltage (such as V1) of the corresponding battery set (such as 102_1) meets a voltage warning condition (such as cell voltage higher than the alert value or other abnormal changes of the cell voltage) or detects the cell temperature (such as T1) of the correspond battery set (such as 102_1) meets a temperature warning condition (such as the cell temperature higher than the alert value or other abnormal changes of the cell temperature), the unit battery management circuit (such as 104_1) transmits a warning signal to the master control circuit 108 through a communication bus (such as CAN/LIN/I2C/RS485 bus). Then, the master control circuit 108 opens the main current switch 114 to block the charge and discharge path of the battery system 100. In general, the warning signal is given a higher priority than other transmitting data in the communication bus to announce the abnormal condition to the master control circuit 108.

On the other hand, the master control circuit 108 may also obtain the system current value I and the system coulomb value Q by the current and coulomb measurement circuit 106, and actively opens the main current switch 114 to block the charge and discharge path when measuring the system current value I meets a current warning condition (such as the system current value higher than the alert value or other abnormal changes of the system current value) or measuring the system coulomb value Q meets a system coulomb warning condition (such as the system coulomb value higher than the alert value or other abnormal changes of the system coulomb value)

In one embodiment, each e unit battery management circuit 104_J, 1≤J≤N, is also coupled to the master control circuit 108 through an emergency announcing line EL. If the unit battery management circuit (such as 104_1) fails to transmit the warning signal to the master control circuit 108 through the communication bus, the unit battery management circuit (such as 104_1) will enable the emergency announcing line EL, to have the master control circuit 108 opening the main current switch 114 to block the charge and discharge path. It may be realized by changing the voltage to enable the emergency announcing line EL such as raising/reducing the voltage of the emergency announcing line EL or applying a pulse. Each unit battery management circuit 104_J may effectively notice the master control circuit 108 to turn off the power through the emergency announcing line EL when the communication bus is disabled, thus this may improve the protection mechanism.

In one embodiment, the battery system 100 further comprises an external power supply 116. The external power supply 116 is a 12V lead acid battery or other independent low-voltage DC power supply for providing electricity to the master control circuit 108 and partial circuits of the unit battery management circuits 104_1-104_N.

Figure 2:
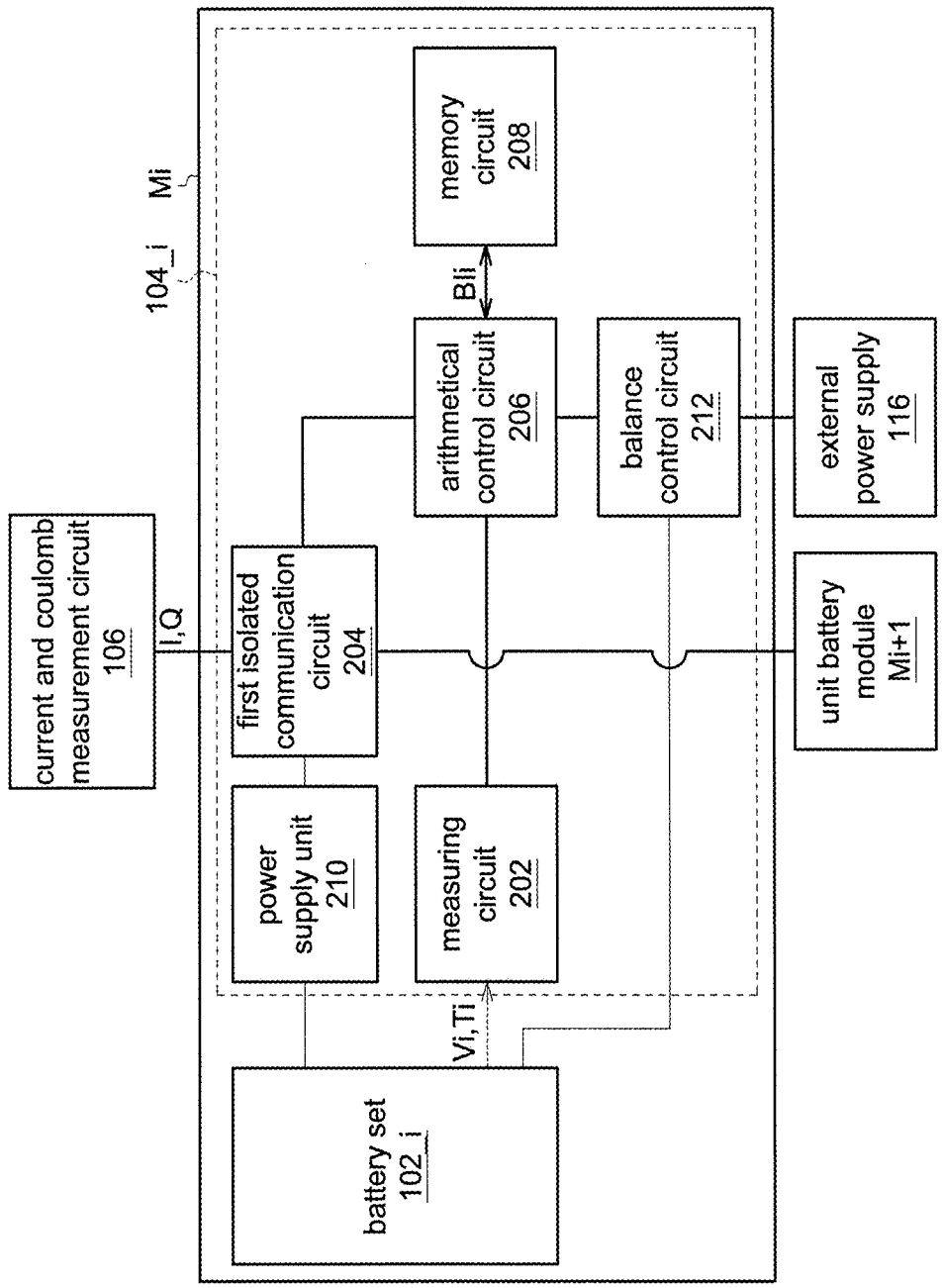
FIG. 2 is a block diagram of a unit battery module, according to an exemplary embodiment.

FIG. 2 is a block diagram of a unit battery module Mi, according to an exemplary embodiment. The unit battery module Mi is one of the unit battery modules M1-MN as shown in FIG. 1, and 1≤i≤N.

The unit battery module Mi comprises a battery set 102_i and a unit battery management circuit 104_i. The unit battery management circuit 104_i mainly includes a measuring circuit 202, a first isolated communication circuit 204, an arithmetical control circuit 206, and a memory circuit 208.

The measuring circuit 202 includes a voltage sensor and a temperature sensor for sensing a cell voltage Vi and a cell temperature Ti of the battery set 102_i.

The first isolated communication circuit 204 is regarded as a communication module of the unit battery module Mi for transmitting and receiving external information such as receiving the system current value I and the system coulomb value Q from the current and coulomb measurement circuit 106 and transmitting to the arithmetical control circuit 206. The unit battery module Mi may also transfer information via the first isolated communication circuit 204 and other unit battery modules (such as Mk, k is not equal to i). In one embodiment, the first isolated communication circuit 204 is a magnetic coupling element or an optical coupling element for isolating the voltage level of inside and outside ends of the module and transferring information.

The arithmetical control circuit 206 may calculate battery information BIi of the battery set 102_i of the unit battery module Mi according to the cell voltage Vi, the cell temperature Ti, the system current value I and the system coulomb value Q. The arithmetical control circuit 206 may be a microprocessor, a microcontroller, an applied circuit for special purpose or other arithmetical processing circuits. The arithmetical control circuit 206 obtains the battery information BIi such as the residual electricity, the deteriorating capacity, the internal resistance and the health status, by performing an operation of an estimation algorithm for the real-time battery information of the battery set 102_i of the unit battery module Mi. The operation result such as the battery information BIi will be stored in the built-in memory circuit 208 of the unit battery module Mi. The memory circuit 208 may be any type of non-volatile memory.

In one embodiment, the unit battery management circuit 104_i further comprises a power supply unit 210. The power supply unit 210 is such as a direct current to direct current (DC-DC) converter and may transfer the electric energy stored in the battery set 102_i to an electricity source of internal functional circuits of the unit battery module Mi. For example, when the first isolated communication circuit 204 needs two sets of power supplies to work normally, the power supply unit 210 may supply electricity to one end of the first isolated communication circuit 204, and the master control circuit 108 (such as a master power converter of the master control circuit 108) may supply electricity to the other end of the first isolated communication circuit 204.

In an embodiment, the unit battery management circuit 104_i further comprises a balance control circuit 212. The balance control circuit 212 may selectively charge or discharge one or more target cells of the battery set 102_i according to the battery information BIi, so as to balance the entire voltage. For example, the balance control circuit 212 may obtain the battery information BIi such as the highest and the lowest voltages of the unit battery module Mi and the temperature via a communication manner, and the arithmetical control circuit 206 performs an operation of balance control logic according to the battery information BIi. Then, by controlling a switch array of the balance control circuit 212 according to a result of the operation, the balance control circuit 212 selectively charges or discharges one or more cells of the battery set 102_i.

Figure 3:
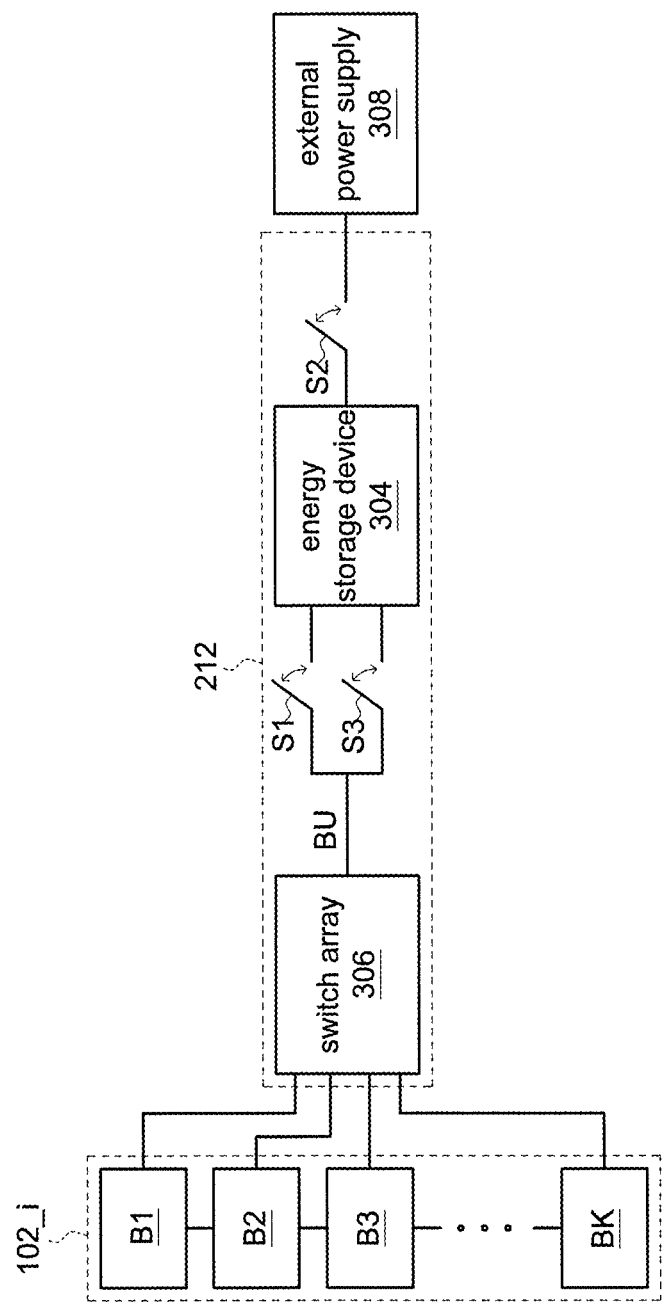
FIG. 3 is a block diagram of a balance control circuit, according to an exemplary embodiment of the disclosure.
Figure 4:
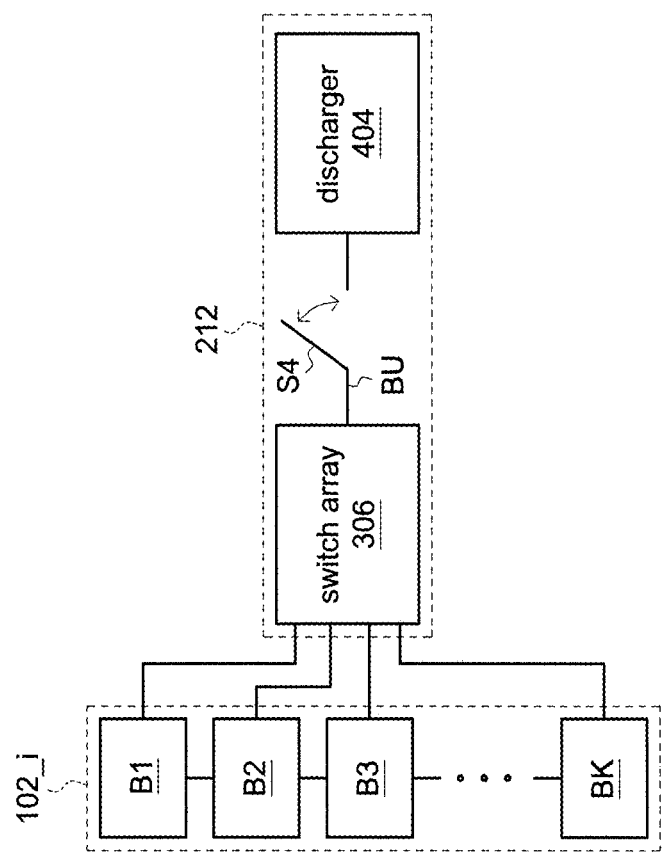
FIG. 4 is a block diagram of a balance control circuit, according to another exemplary embodiment of the disclosure.

For better understanding the operating mechanism of the balance control circuit 212, please refer to FIG. 3 and FIG. 4.

FIG. 3 is a block diagram of the balance control circuit 212, according to an exemplary embodiment. The balance control circuit 212 is coupled to the battery set 102_i and the battery set 102_i comprises one or more cells B1-BK (K is a positive integer). The battery set 102_i may be a cell string composed by any one set of the battery sets 102_i-102_N in FIG. 1, but the scope of the disclosure is not limited thereto. In FIG. 3, the balance control circuit 212 balances the entire voltage by a charge mechanism.

The balance control circuit 212 comprises an energy storage device 304 and a switch array 306. The energy storage device 304 is a chargeable and dischargeable device similar to a mobile power pack. The switch array 306 is coupled to the cells B1-BK and selectively lets at least one target cell of the cells B1-BK be electrically coupled to a charge and discharge bus BU. For example, a positive terminal and a negative terminal of the target cell is coupled to the charge and discharge bus BU. The energy storage device 304 is coupled to the charge and discharge bus BU through a first charge switch S1 and a first discharge switch S3. The first charge switch S1 and the first discharge switch S3 control whether it is conductive between the energy storage device 304 and the switch array 306 or not. The energy storage device 304 is coupled to an external power supply 308 through a second charge switch S2, and the second charge switch S2 controls whether it is conductive between the energy storage device 304 and the external power supply 308 or not.

When the first discharge switch S3 is closed, the energy storage device 304 charges the target cell which is connected to the charge and discharge bus BU, so that the voltage and capacity of the target cell is increased. On the contrary, if it is expected that the target cell may charge the energy storage device 304 (the target cell corresponds to discharge), then the first charge switch S1 is closed, and the target cell which is carried on the charge and discharge bus BU charges the energy storage device 304, so that the voltage of the target cell is decreased. In addition, it may close the second charge switch S2, to have the external power supply 308 charging the energy storage device 304. When the external power supply 308 is not used to charge the energy storage device 304 in usual, the second charge switch S2 may be opened to avoid the energy storage device 304 consuming the electricity of the external power supply 308 continuously. In detail, when any one of the cells B1-BK of the battery set 102_i needs to be supplied the electricity by the energy storage device 304, the energy storage device 304 cooperation with the switch array 306 by the first discharge switch S3 charges the any one of the cells B1-BK of the battery set 102_i, and the energy storage device 304 is in a discharged state at the time. When the internal power of the energy storage device 304 is insufficient, the external power supply 308 may charge the any one of the cells B1-BK of the battery set 102_i through the switch array 306 by closing the second charge switch S2 and the first discharge switch S3 at the same time. Besides, the energy storage device 304 may be supplied the electricity in two ways. One is the external power supply 308 charges the energy storage device 304 by closing the second charge switch S2. The external power supply 308 may be an independent low-voltage DC power supply in the system, as the external power supply 116 shown in FIG. 1, and it may be realized by a 12-volt lead acid battery to charge the energy storage device 304. The other way is using the particular cells B1-BK to charge the energy storage device 304 through the switch array 306 by closing the first charge switch S1. In the design of such architecture, only one charge way may be used, and the two charge ways can't cooperate at the same time.

For example, if a voltage of the cell B1 of the battery set 102_i is lower or obviously lower than the voltages of other cells B2-BK of the battery set 102_i, the switch array 306 will connect to the cell B1 and the charge and discharge bus BU, and will also close the connections between other cells B2-BK and the charge and discharge bus BU. At this time, when the second charge switch S2 and the first discharge switch S3 are closed, the external power supply 308 charges the cell B1 individually, or when the power of the energy storage device 304 is sufficient, then individually closes the first discharge switch S3 of the energy storage device 304 to charge the cell B1 through the charge and discharge bus BU. Thus, the voltage of the cell B1 is approximately the same as other cells B2-BK, so as to balance the entire voltage of the system.

FIG. 4 is a block diagram of the balance control circuit 212, according to another exemplary embodiment. The balance control circuit 212 is coupled to the battery set 102_i, and the battery set 102_i comprises one or more cells B1-BK (K is positive integer). The battery set 102_i may be a cell string composed by any one of the battery set 102_i-102_N in FIG. 1, but the scope of the disclosure is not limited thereto. In the exemplar of FIG. 4, the balance control circuit 212 balances the entire voltage by a discharge mechanism.

The balance control circuit 212 comprises a discharger 404 and a switch array 306. The discharger 404 is an energy consumption element such as a resistance. The switch array 306 is coupled to the battery set 102_i and selectively lets at least one target cell of the cells B1-BK be electrically coupled to a charge and discharge bus BU. A second discharge switch S4 is coupled between the discharger 404 and the charge and discharge bus BU, and the second discharge switch S4 controls whether it is conductive between the discharger 404 and the switch array 306 or not. When the second discharge switch S4 is closed, the target cell is connected to the charge and discharge bus BU and the capacity is discharged through the discharger 404, so as to decrease the voltage of the target cell.

For example, if a voltage of the cell B1 of the battery set 102_i is higher or obviously higher than the voltages of other cells B2-BK of the battery set 102_i, the switch array 306 will connect to the cell B1 and the charge and discharge bus BU, and also close the connections between other cells B2-BK and the charge and discharge bus BU. At this time, when the second discharge switch S4 is closed, the cell B1 is discharged individually. Thus, the voltage of the cell B1 is approximately the same as other cells B2-BK, so as to balance the entire voltage.

Figure 5:
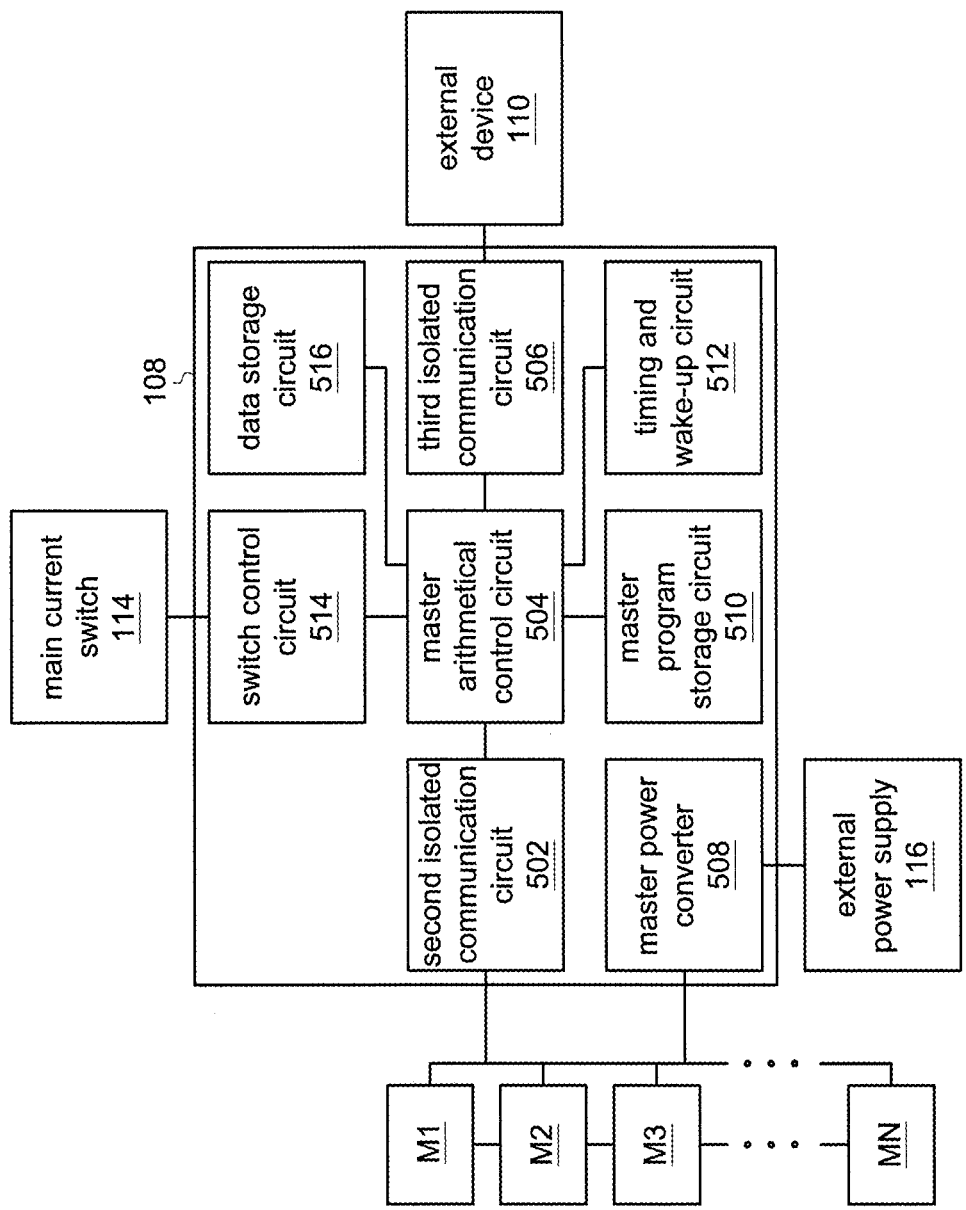
FIG. 5 is an exemplary block diagram of a master control circuit shown in FIG. 1.

FIG. 5 is an exemplary block diagram of the master control circuit 108 shown in FIG. 1. As shown in FIG. 5, the master control circuit 108 comprises a second isolated communication circuit 502, a master arithmetical control circuit 504, a third isolated communication circuit 506, a master power converter 508, a master program storage circuit 510, a timing and wake-up circuit 512, a switch control circuit 514 and a data storage circuit 516.

The second isolated communication circuit 502 is coupled to the master arithmetical control circuit 504, and the second isolated communication circuit 502 receives and transmits the massage of each of unit battery modules M1-MN. For example, the second isolated communication circuit 502 receives the information such as the battery information BI1-BIN from each of the unit battery modules M1-MN or transmits the data and the control command to each of unit battery modules M1-MN.

The master arithmetical control circuit 504 controls all the measurement circuits, communication circuits, data storage circuits, and switch control circuits of the battery system 100, and performs calculations and controls actions according to the information from all the circuits. For example, the master arithmetical control circuit 504 calculates the system battery information SBI such as the highest and/or lowest voltage and temperature information of the entire battery system 100 according to the information such as the battery information BI1-BIN from the unit battery modules M1-MN, or determines whether to perform the operation of power failure or not according to the warning signal from the unit battery modules M1-MN. At the same time, the master arithmetical control circuit 504 also receives the command of the external device 110 and responds to the related information.

The third isolated communication circuit 506 is coupled to the master arithmetical control circuit 504 and replies the information of the entire battery such as the system battery information SBI to the external device 110, then the external device 110 may regulate the energy consumption status or proceed other corresponding operations according to the information of the battery.

The master power converter 508 is coupled to the external power supply 116, and is used to transform the power of the external power supply 116 and supply the electricity (such as 5 volts) to all the circuits of the master control circuit 108. Besides, because the isolated communication circuits (such as the first isolated communication circuit 204 in FIG. 2) of the unit battery modules M1-MN need a separate power supply to achieve the isolated effect, therefore, an output power of the master power converter 508 may also be used as the power needed by the isolated communication circuits of the unit battery modules M1-MN. In one embodiment, the master power converter 508 may be realized by a separate circuit without the master control circuit 108.

The master program storage circuit 510 is coupled to the master arithmetical control circuit 504, and is used to store the related codes which the master arithmetical control circuit 504 needs for performing arithmetic and controlling processes. In detail, if all the data received through the isolated communication needs to be performed arithmetic and control processes, and requires different control actions according to the status, the related codes may be stored in the master program storage circuit 510.

The timing and wake-up circuit 512 is coupled to the master arithmetical control circuit 504, and is used to calculates the related time information such as years, months, days, hours, and minutes of the battery system 100. In addition, the timing and wake-up circuit 512 may set a regular period of time to wake up the battery system 100 to perform a self-examination before entering a sleep mode.

The switch control circuit 514 is controlled by the master arithmetical control circuit 504 and selectively switches the main current switch 114. For example, the master arithmetical control circuit 504 responds to the warning signal transmitted from the unit battery modules M1-MN, the enabled emergency announcing line EL, or the condition that the system current value I or the system coulomb value Q achieves the warning criteria, and opens the main current switch 114 through the switch control circuit 514 to turn off the power.

The data storage circuit 516 is coupled to the master arithmetical control circuit 504 and is used to store related parameters of the battery system 100. The parameters may indicate, for example, the type, the date of manufacture, and the battery protection parameter of the battery system 100 or the highest/lowest voltage, the temperature, the residual electricity, the impedance and the health status of each string of the battery set.

Figure 6:
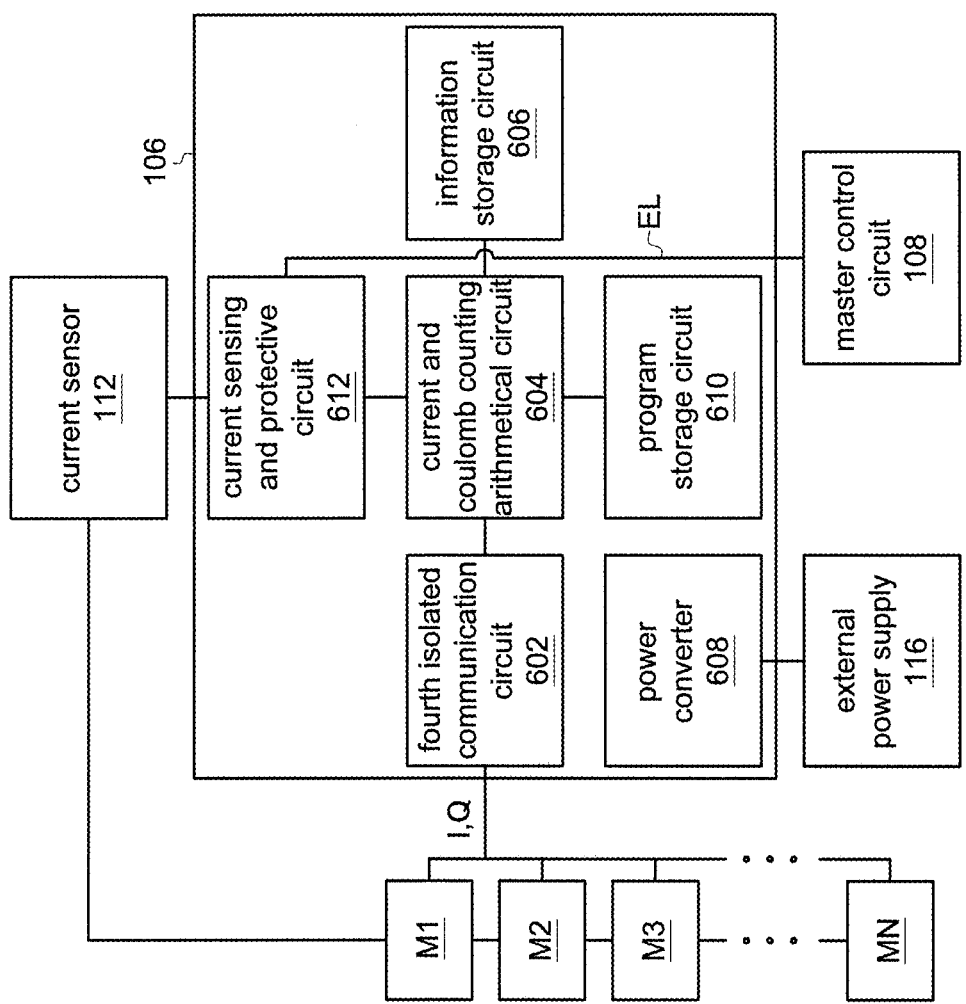
FIG. 6 is an exemplary block diagram of a current and coulomb measurement circuit shown in FIG. 1.

FIG. 6 is a block diagram of a current and coulomb measurement circuit 106 shown in FIG. 1. The current and coulomb measurement circuit 106 comprises a fourth isolated communication circuit 602, a current and coulomb arithmetical circuit 604, an information storage circuit 606, a power converter 608, a program storage circuit 610 and a current sensing and protecting circuit 612.

The fourth isolated communication circuit 602 is coupled to the current and coulomb arithmetical circuit 604, and is responsible for receiving and transmitting the signal and the communication between the current and coulomb measurement circuit 106 and the external circuit. For example, the fourth isolated communication circuit 602 may transmit the data such as the system current value I and the system coulomb value Q to each of the unit battery modules M1-MN and the master control circuit 108 through a communication bus.

The current and coulomb arithmetical circuit 604 obtains the system current value I according to the current measuring data of the current sensor 112, and calculates the integral result of electric quantity of charge and discharge according to a set sampling period, to generate the system coulomb value Q. After getting the system current value I and the system coulomb value Q, the current and coulomb arithmetical circuit 604 transmits the system current value I and the system coulomb value Q to all of the circuits such as the unit battery modules M1-MN and the master control circuit 108 which are connected to the internal communication network of the battery system 100 in a broadcast manner through the fourth isolated communication circuit 602.

The information storage circuit 606 is coupled to the current and coulomb arithmetical circuit 604, and is responsible for storing the arithmetical results from the current and coulomb arithmetical circuit 604 and the required parameters during the calculation. These required parameters may be such as the current measuring data of the current sensor 112, the system current value I, the system coulomb value Q, and so on.

The power converter 608 is coupled to the external power supply 116 and transforms the power supplied by the external power supply 116 into the electricity required by all circuits in the current and coulomb measurement circuit 106. Or in an embodiment, the current and coulomb measurement circuit 106 may be supplied the electricity directly by a power system such as the master power converter 508 in FIG. 5 of the master control circuit 108.

The program storage circuit 610 is coupled to the current and coulomb arithmetical circuit 604, and is used to store the related codes which the current and coulomb arithmetical circuit 604 needs for calculating the system current value I and the system coulomb value Q. The related codes may include, for example, the arithmetic program codes on how to transform the current signals to the actual current values, the integral result of the coulomb value, and the determination of the state of charge and discharge.

The current sensing and protecting circuit 612 is coupled to the current sensor 112, and may measures the voltage difference signal of the current sensor 112 to provide the current and coulomb arithmetical circuit 604 calculating and generating the system current value I. In one embodiment, when the current is abnormal, the current sensing and protecting circuit 612 may directly announce the master control circuit 108 to shut off the power through the emergency announcing line EL.

In one embodiment, the current and coulomb measurement circuit 106 may be integrated into the master control circuit 108. At the time, after getting the current measuring data from the current sensor 112, the current and coulomb measurement circuit 106 transmits the current measuring data to the master arithmetical control circuit 504 of the master control circuit 108 to calculate and generate the system current value I and the system coulomb value Q, and then broadcasts to each of the unit battery modules M1-MN through the second isolated communication circuit 502.

As aforementioned, in the embodiments of the disclosure, the battery system may calculate by itself and store the battery information of a corresponding battery set through each unit battery module. Because the battery information of each battery set is stored in its corresponding unit battery module, it may change the excessive deteriorating or abnormal unit battery module of the battery set as long as a removable battery design is arranged. Thus, it may not only increase the maintenance and the recyclables of the battery set, but also decrease required hidden risks and costs due to the damage of the battery set. Besides, because each unit battery module may calculate the battery information of the corresponding battery set by it-self, it may share responsibility of the computation of the master control circuit in the battery system effectively, thereby reducing the calculation requirements and costs of the system. On the other hand, each unit battery module may be connected to a balance control circuit and automatically adjust the voltage balance status of the battery set according to the battery information, so as to increase the use efficiency of the system.

It will be apparent to those skilled in the art that various modifications and variations can be made to the disclosed embodiments. It is intended that the specification and examples be considered as exemplars only, with a true scape of the disclosure being indicated by the following claims and their equivalents.

What is claimed is:

1. A battery system, comprising:
    a unit battery module, comprising a battery set and a unit battery management circuit, wherein the battery set is used to store an electrical energy and the unit battery management circuit calculates a battery information of the battery set according to a system current value, a system coulomb value, a cell voltage and a cell temperature of the battery set;
    a current and coulomb measurement circuit, coupled to the unit battery module, wherein the current and coulomb measurement circuit generates the system current value according to a current flowing though the battery set, generates the system coulomb value by integrating the system current value, and provides the system current value and the system coulomb value to the unit battery module;
    a master control circuit, coupled to the unit battery module, wherein the master control circuit receives the battery information from the unit battery module, generates a system battery information according to the battery information and provides the system battery information to an external device; and
    a main current switch, controlled by the master control circuit, wherein the main current switch selectively conducts or blocks a charge and discharge path of the battery system;
    wherein when the cell voltage meets a voltage warning condition or the cell temperature meets a temperature warning condition, the unit battery management circuit transmits a warning signal to the master control circuit through a communication bus, so as to open the main current switch to block the charge and discharge path by the master control circuit, and
    when the system current value meets a current warning condition or the system coulomb value meets with a system coulomb warning condition, the master control circuit actively opens the main current switch to block the charge and discharge path.

2. The battery system as claimed in claim 1, further comprising:
    a current sensor, connected to the unit battery module in series, and coupled to the current and coulomb measurement circuit, wherein the current sensor is adapted to measure the current passing through the battery set.

3. The battery system as claimed in claim 1, wherein when the unit battery management circuit fails to transmit the warning signal to the master control circuit through the communication bus, the unit battery management circuit enables an emergency announcing line, to have the master control circuit opening the main current switch to block the charge and discharge path.

4. The battery system as claimed in claim 1, wherein the unit battery management circuit comprising:
    a measuring circuit for sensing the cell voltage and the cell temperature of the battery set;
    a first isolated communication circuit for receiving the system current value and the system coulomb value from the current and coulomb measurement circuit;
    an arithmetical control circuit for calculating the battery information of the battery set according to the cell voltage, the cell temperature, the system current value and the system coulomb value; and
    a memory circuit for storing the battery information.

5. The battery system as claimed in claim 1, wherein the unit battery management circuit further comprising:
    a balance control circuit for selectively charging or discharging one or more target cells of the battery set according to the battery information.

6. The battery system as claimed in claim 5, wherein the balance control circuit comprising:
    an energy storage device, which is chargeable and dischargeable; and
    a switch array, coupled to the battery set, wherein the switch array selectively lets one or more target cells be electrically coupled to a charge and discharge bus bar;
    wherein the energy storage device is coupled to the charge and discharge bus bar through a first charge switch and a first discharge switch, and the first charge switch and the first discharge switch control whether it is conductive between the energy storage device and the switch array or not,
    wherein the energy storage device is coupled to an external power supply through a second charge switch, and the second charge switch controls whether it is conductive between the energy storage device and the external power supply or not,
    wherein when the first discharge switch is closed, the energy storage device charges the one or more target cells connected to the charge and discharge bus,
    when the first charge switch is closed, the one or more target cells connected to the charge and discharge bus charge the energy storage device, and
    when the second charge switch is closed, the external power supply charges the energy storage device.

7. The battery system as claimed in claim 5, wherein the balance control circuit comprising:
    a discharger; and
    a switch array, coupled to the battery set, wherein the switch array selectively lets the one or more target cells be electrically coupled to a charge and discharge bus;
    wherein a second discharge switch is coupled between the discharger and the charge and discharge bus, and the second discharge switch controls whether it is conductive between the discharger and the switch array or not,
    wherein when the second discharge switch is closed, the one or more target cells connected to the charge and discharge bus discharge through the discharger.

8. The battery system as claimed in claim 1, wherein the battery information comprises at least one of a residual capacity, a deteriorating capacity, an internal resistance, and a health status corresponding to the battery set.

9. The battery system as claimed in claim 1, wherein the current and coulomb measurement circuit broadcasts the system current value and the system coulomb value to the unit battery module through a communication bus.

10. The battery system as claimed in claim 1, wherein the master control circuit comprising:
- a master arithmetical control circuit for calculating the system battery information according to the battery information from the unit battery module;
- a second isolated communication circuit, coupled to the master arithmetical control circuit, wherein the second isolated communication circuit receives and transmits the battery information of the unit battery module;
- a third isolated communication circuit, coupled to the master arithmetical control circuit, wherein the third isolated communication circuit supplies the system battery information to the external device;
- a master power converter, coupled to an external power supply, wherein the master power converter transforms a power of the external power supply into an electricity and supplies the electricity to the master control circuit;
- a master program storage circuit, coupled to the master arithmetical control circuit, wherein the master program storage circuit stores a plurality of codes which the master arithmetical control circuit needs for performing an arithmetic and controlling process;
- a timing and wake-up circuit, coupled to the master arithmetical control circuit, wherein the timing and wake-up circuit calculates a time information of the battery system;
- a switch control circuit, controlled by the master arithmetical control circuit, wherein the switch control circuit selectively switches a main current switch to conduct or block a charge and discharge path of the battery system; and
- a data storage circuit, coupled to the master arithmetical control circuit, wherein the data storage circuit stores at least one parameter of the battery system, and the at least one parameter indicates at least one of a type, a date of manufacture, and a battery protection parameter of the battery system, a highest or lowest voltage, a temperature, a residual capacity, an impedance and a health status of the battery set.

11. The battery system as claimed in claim 1, wherein the current and coulomb measurement circuit comprising:
- a current and coulomb arithmetical circuit for obtaining the system current value according to a current measuring data of a current sensor, and calculating an integral result of electric quantity of charge and discharge to generate the system coulomb value, wherein the current sensor connects to the battery set in series;
- a fourth isolated communication circuit, coupled to the current and coulomb arithmetical circuit, wherein the fourth isolated communication circuit transmits the system current value and the system coulomb value to the unit battery module and the master control circuit;
- an information storage circuit, coupled to the current and coulomb arithmetical circuit, wherein the information storage circuit stores the system current value and the system coulomb value;
- a power converter, coupled to an external power supply, wherein the power converter transforms a power of the external power supply into an electricity and supplies the electricity to the current and coulomb measurement circuit;
- a program storage circuit, coupled to the current and coulomb arithmetical circuit, wherein the program storage circuit stores a plurality of codes which the current and coulomb arithmetical circuit needs for calculating the system current value and the system coulomb value; and
- a current sensing and protecting circuit, coupled to the current sensor, wherein the current sensing and protecting circuit measures a voltage difference signal of the current sensor to provide the current and coulomb arithmetical circuit calculating and generating the system current value.

12. A battery management system, adapted to manage an information of a battery set, the battery management system comprising:
- a unit battery management circuit for calculating a battery information of the battery set according to a system current value, a system coulomb value, a cell voltage and a cell temperature of the battery set;
- a current and coulomb measurement circuit, coupled to the unit battery management circuit, wherein the current and coulomb measurement circuit generates the system current value according to a current flowing through the battery set, generates the system coulomb value by integrating the system current value, and transmits the system current value and the system coulomb value to the unit battery management circuit;
- a master control circuit, coupled to the unit battery management circuit, wherein the master control circuit receives the battery information from the unit battery management circuit, generates a system battery information according to the battery information and provides the system battery information to an external device; and
- a main current switch, controlled by the master control circuit, wherein the main current switch selectively conducts or blocks a charge and discharge path of the battery system;
- wherein when the cell voltage meets a voltage warning condition or the cell temperature meets a temperature warning condition, the unit battery management circuit transmits a warning signal to the master control circuit through a communication bus, so as to open the main current switch to block the charge and discharge path by the master control circuit, and
- when the system current value meets a current warning condition or the system coulomb value meets with a system coulomb warning condition, the master control circuit actively opens the main current switch to block the charge and discharge path.

13. A battery system, comprising:
- a unit battery module, comprising a battery set and a unit battery management circuit, wherein the battery set is used to store an electrical energy and the unit battery management circuit calculates a battery information of the battery set according to a system current value, a system coulomb value, a cell voltage and a cell temperature of the battery set;
- a current and coulomb measurement circuit, coupled to the unit battery module, wherein the current and coulomb measurement circuit generates the system current value according to a current flowing though the battery set, generates the system coulomb value by integrating the system current value, and provides the system current value and the system coulomb value to the unit battery module; and
- a master control circuit, coupled to the unit battery module, wherein the master control circuit receives the battery information from the unit battery module, generates a system battery information according to the battery information and provides the system battery information to an external device,
- wherein the master control circuit comprising:

a master arithmetical control circuit for calculating the system battery information according to the battery information from the unit battery module;

a second isolated communication circuit, coupled to the master arithmetical control circuit, wherein the second isolated communication circuit receives and transmits the battery information of the unit battery module;

a third isolated communication circuit, coupled to the master arithmetical control circuit, wherein the third isolated communication circuit supplies the system battery information to the external device;

a master power converter, coupled to an external power supply, wherein the master power converter transforms a power of the external power supply into an electricity and supplies the electricity to the master control circuit;

a master program storage circuit, coupled to the master arithmetical control circuit, wherein the master program storage circuit stores a plurality of codes which the master arithmetical control circuit needs for performing an arithmetic and controlling process;

a timing and wake-up circuit, coupled to the master arithmetical control circuit, wherein the timing and wake-up circuit calculates a time information of the battery system;

a switch control circuit, controlled by the master arithmetical control circuit, wherein the switch control circuit selectively switches a main current switch to conduct or block a charge and discharge path of the battery system; and a data storage circuit, coupled to the master arithmetical control circuit, wherein the data storage circuit stores at least one parameter of the battery system, and the at least one parameter indicates at least one of a type, a date of manufacture, and a battery protection parameter of the battery system, a highest or lowest voltage, a temperature, a residual capacity, an impedance and a health status of the battery set.

14. A battery system, comprising:

a unit battery module, comprising a battery set and a unit battery management circuit, wherein the battery set is used to store an electrical energy and the unit battery management circuit calculates a battery information of the battery set according to a system current value, a system coulomb value, a cell voltage and a cell temperature of the battery set;

a current and coulomb measurement circuit, coupled to the unit battery module, wherein the current and coulomb measurement circuit generates the system current value according to a current flowing though the battery set, generates the system coulomb value by integrating the system current value, and provides the system current value and the system coulomb value to the unit battery module; and a master control circuit, coupled to the unit battery module, wherein the master control circuit receives the battery information from the unit battery module, generates a system battery information according to the battery information and provides the system battery information to an external device, wherein the current and coulomb measurement circuit comprising:

a current and coulomb arithmetical circuit for obtaining the system current value according to a current measuring data of a current sensor, and calculating an integral result of electric quantity of charge and discharge to generate the system coulomb value, wherein the current sensor connects to the battery set in series;

a fourth isolated communication circuit, coupled to the current and coulomb arithmetical circuit, wherein the fourth isolated communication circuit transmits the system current value and the system coulomb value to the unit battery module and the master control circuit;

an information storage circuit, coupled to the current and coulomb arithmetical circuit, wherein the information storage circuit stores the system current value and the system coulomb value;

a power converter, coupled to an external power supply, wherein the power converter transforms a power of the external power supply into an electricity and supplies the electricity to the current and coulomb measurement circuit;

a program storage circuit, coupled to the current and coulomb arithmetical circuit, wherein the program storage circuit stores a plurality of codes which the current and coulomb arithmetical circuit needs for calculating the system current value and the system coulomb value; and a current sensing and protecting circuit, coupled to the current sensor, wherein the current sensing and protecting circuit measures a voltage difference signal of the current sensor to provide the current and coulomb arithmetical circuit calculating and generating the system current value.

* * * * *